US008915678B2

(12) United States Patent
Boulkertous et al.

(10) Patent No.: US 8,915,678 B2
(45) Date of Patent: Dec. 23, 2014

(54) MULTICOMPONENT COMPOSITION FOR FILLING AND/OR INJECTING CRACKS, FLAWS AND CAVITIES IN STRUCTURES OR EARTH AND ROCK FORMATIONS

(75) Inventors: Nabil Boulkertous, Guenzburg (DE); Magnus Kloster, Dietenheim (DE); Klaus Peter Meyer, Ratingen (DE)

(73) Assignee: Sika Technology AG, Baar (CH)

( * ) Notice: Subject to any disclaimer, the term of this patent is extended or adjusted under 35 U.S.C. 154(b) by 532 days.

(21) Appl. No.: 12/808,553

(22) PCT Filed: Dec. 18, 2008

(86) PCT No.: PCT/EP2008/067899
§ 371 (c)(1),
(2), (4) Date: Jun. 16, 2010

(87) PCT Pub. No.: WO2009/077591
PCT Pub. Date: Jun. 25, 2009

(65) Prior Publication Data
US 2010/0266348 A1  Oct. 21, 2010

(30) Foreign Application Priority Data
Dec. 18, 2007 (DE) .......................... 10 2007 061 497

(51) Int. Cl.
C04B 28/04 (2006.01)
C04B 103/00 (2006.01)
C04B 111/70 (2006.01)

(52) U.S. Cl.
CPC ......... *C04B 28/04* (2013.01); *C04B 2103/0046* (2013.01); *C04B 2111/70* (2013.01)
USPC .......................................... 405/263; 405/266

(58) Field of Classification Search
CPC ................. C04B 20/008; C04B 28/04; C04B 2103/0046
USPC ............ 405/57, 263, 266, 267, 269; 106/600, 106/900
See application file for complete search history.

(56) References Cited

U.S. PATENT DOCUMENTS

| | | | |
|---|---|---|---|
| 4,197,225 A | | 4/1980 | Emmons et al. |
| 4,714,507 A * | | 12/1987 | Ohgushi .................. 156/91 |
| 6,602,972 B1 * | | 8/2003 | Schwarte et al. ............. 528/45 |
| 7,001,975 B2 * | | 2/2006 | Bremser et al. .................. 528/75 |
| 2002/0007027 A1 | | 1/2002 | Wang et al. |
| 2004/0047694 A1 * | | 3/2004 | Sandor et al. .................. 405/263 |
| 2006/0122352 A1 | | 6/2006 | Burckhardt |
| 2007/0148342 A1 * | | 6/2007 | Kalkanoglu et al. .......... 427/212 |

FOREIGN PATENT DOCUMENTS

| | | |
|---|---|---|
| DE | 1 495 329 | 1/1969 |
| DE | 35 24 796 A1 | 1/1986 |
| DE | 197 23 474 A1 | 12/1998 |
| EP | 0 893 486 A1 | 1/1999 |
| EP | 1 371 671 | 12/2003 |
| JP | A-62-256751 | 11/1987 |
| JP | A-4-254457 | 9/1992 |
| JP | A-8-217516 | 8/1996 |
| JP | A-2002-12463 | 1/2002 |
| JP | A-2004-196568 | 7/2004 |
| WO | WO 2007/071636 A2 | 6/2007 |

OTHER PUBLICATIONS

Sgarbi et al., WO 2007/071636 Tranlation.*
Miura, Ryuichi et al., "Low-solubility acrylic monomer in-situ polymerization in concrete manufacture for high strength," Chemical Abstracts, American Chemical Society, No. 18, May 1988, p. 326.
International Search Report issued in International Application No. PCT/EP2008/067899 on Jun. 6, 2009 (with English-language translation).
International Preliminary Report on Patentability issued in International Patent Application No. PCT/EP2008/067899, dated Jul. 6, 2010.
6001 Chemical Abstracts, vol. 110, No. 8, p. 335, Columbus, Ohio, USA, Apr. 17, 1989, XP000017799.
European Office Action issued in Application No. 08 863 132.0; Dated Nov. 2, 2011 (With Translation).
Jun. 9, 2014 Notice of Reasons for Rejection issued in Japanese Application No. 2010-538731 with English-language translation.

* cited by examiner

*Primary Examiner* — Benjamin Fiorello
(74) *Attorney, Agent, or Firm* — Oliff PLC

(57) ABSTRACT

A multicomponent composition for filling and/or grouting cracks, flaws, and cavities in structures or earth and stone formations, including: i) water; ii) cement; iii) an aqueous plastic dispersion; and iv) at least one monomer, which can be radically polymerized, or a polyisocyanate. A material is thus obtained as a sealant having both a swelling capacity and expandability.

10 Claims, No Drawings

MULTICOMPONENT COMPOSITION FOR FILLING AND/OR INJECTING CRACKS, FLAWS AND CAVITIES IN STRUCTURES OR EARTH AND ROCK FORMATIONS

BACKGROUND

The invention relates to a multicomponent composition for filling and/or injecting cracks, flaws and cavities in structures or earth and rock formations.

Various types of materials are known for filling and/or injecting cracks, flaws and cavities in structures or earth and rock formations to prevent the penetration of moisture. In particular, sealants based on polyurethanes, epoxy resins and (meth)acrylates and based on cement are used. These sealants each have a very independent spectrum of properties, with the result that they are used for different filling or injection purposes. These material properties are divided into three groups according to the European standard EN 1504, Part 5 "Injection of concrete components". A first group comprises the friction-bonding sealants, a second group comprises the expandable sealants and a third group comprises the swellable sealants.

The first group of friction-bonding sealants includes epoxy resins and cementitious sealants. The second group of expandable sealants includes the polyurethanes and the third group of swellable sealants includes the poly(meth)acrylates.

Owing to their high cost-efficiency, cementitious sealants of the first group are frequently used for filling relatively large cavities, such as, for example, ridge injections. For fillings providing a seal, however, these cementitious materials are suitable only to a limited extent since, in the case of water-carrying flaws, they would be washed out before hardening. Furthermore, owing to the filling with friction bonding, there is the danger that the filled flaws will break open again when the components are subjected to loads.

In contrast to cementitious sealants, sealants based on organic materials, such as, for example, polyurethanes or poly(meth)acrylates, have very broad reaction behavior which can be substantially influenced according to the chemical nature of the sealant. Thus, in particular the curing time of the composition can be adjusted in a very variable manner in a range from a few seconds to several hours by means of accelerating substances, such as, for example, catalysts. Furthermore, it is possible to prepare sealants which, owing to their flexible properties, absorb movements within the filled body up to a certain extent without damage. However, the higher material costs are disadvantageous in the case of the sealants based on organic materials. In the case of customary epoxy resins and polyurethanes, organic solvents are moreover required for cleaning the equipment necessary in the processing and in the application. This in turn is less economical and should rather be considered problematic from the environmental point of view since the solvents have to be disposed of after their use for cleaning. Water-based systems, such as typically poly(meth)acrylate systems or specific hydrophilic polyurethanes (polyurethane gels), prove to be less problematic from the ecological point of view but, owing to their swelling behavior, are associated with a rather low pH in the discussion regarding a possible danger of corrosion for reinforcing steel in reinforced concrete structures.

It is also known that cementitious materials as sealants can be mixed in the non-set state with plastic dispersions in order positively to influence the flow, solidification and processing properties of the still flowable sealant. At high concentrations of such plastic dispersions in the non-set sealant, however, the proportion of plastic has an effect which is not negligible in the hardened state, for example on the hardness, the porosity and the density.

When selecting the sealants, the choice is limited to the combination of the properties of the individual constituents in the unhardened and in the hardened state. It would be desirable if the properties of the abovementioned sealants of the three different groups according to EN 1504 could be freely combined.

SUMMARY

It is therefore an object of the invention to provide a sealant for filling and/or injecting cracks, flaws and cavities in structures or earth and rock formations which overcomes the disadvantages of the prior art and whose properties both in the initial state and in the hardened state can be adjusted over a wide range.

Surprisingly, it was found that multicomponent compositions as claimed in claim 1 achieve this object.

By using an aqueous composition comprising water, a cementitious binder, an aqueous plastic dispersion and at least one monomer capable of free radical polymerization or a polyisocyanate in a manner by no means obvious to the person skilled in the art, it is possible to provide a sealant which combines the advantages of cementitious systems, namely the long life, stability and high cost-efficiency, with those of plastic-based systems, namely the wide range of properties.

The mixing of cement as a sealant of the first group with the sealants of the other groups is carried out in such a way that the composition according to the invention has the organic constituents as monomers or prepolymers or as polymer blocks. Only on setting or on hardening of the composition according to the invention do organic polymeric constituents form therein. As a result of the formation of the polymer during the setting in addition to the inorganic cement, a sealant having previously unknown properties results. The inorganic cement is present in a matrix comprising organic constituents. Such mixtures provide a property spectrum differing from that of a pure mixture of cement, which sets alone, in addition to a dispersion of plastic. In the latter, the resulting cement phases form cavities filled with plastic. Although these phases are lighter than the pure cement phases, these porous cements show no expandability and also no swellability.

As a result of the mixing, according to the invention, of non-set cementitious binder and monomers or polyisocyanates capable of free radical polymerization, mixed phases of organic polymer and inorganic cement form on hardening, the organic polymer forming networks within which cement phases having very small domains form. In the end, a cementitious sealant which has considerable swellability and expandability is obtained.

A further advantage of the composition according to the invention is the good adjustability of the setting time or of the hardening time. This is dominated by the curing behavior of the organic material and ranges from a few seconds to several hours. When, in the composition according to the invention, the organic fraction has substantially cured, a time remains for the cementitious binder to undergo subsequent hardening. The composition is therefore readily controllable in its setting behavior. Compositions or sealants which are based on pure cement are limited to the setting time of the cement. Cement is by far not adjustable as broadly in its setting behavior by additives as compositions according to the invention.

As a result of the swellability and/or expandability, the composition according to the invention is also capable of reliably sealing small joints and/or cracks after it has penetrated into them. In the case of expanding joints and/or cracks, too, the resulting change in the cavity to be filled can be compensated by the properties of the composition according to the invention, which is not possible with the purely cement-based injection materials.

In addition to the advantageous mechanical-physical properties, the composition according to the invention also has advantageous chemical properties. While the sealants based on poly(meth)acrylates have a low pH according to the acid property of the monomers, the composition according to the invention has alkaline properties after setting. The higher pH is introduced by the cementitious binder and helps to protect reinforcing steel by chemical passivation. The acidic to not more than weakly basic properties of the pure poly(meth)acrylate on the other hand lead to premature corrosion of the reinforcing steels at their contact points with the sealant.

Furthermore, on setting, pure cement suspensions often show a shrinkage effect which arises through the crystallization of the inorganic constituents in the cement. The swelling property of compositions according to the invention compensates for this shrinkage effect. In this way, no hairline cracks or capillaries form within the sealant, through which moisture could penetrate into the cavity.

Compared with polyurethane foams, the composition according to the invention also has ecological advantages.

Further aspects of the invention form the subject of further independent claims. Particularly preferred embodiments of the invention form the subject of the dependent claims.

DETAILED DESCRIPTION OF THE EMBODIMENTS

The present invention relates to a multicomponent composition for filling and/or injecting cracks, flaws and cavities in structures or earth and rock formations, comprising
i) water;
ii) at least one cementitious binder;
iii) an aqueous plastic dispersion; and
iv) at least one monomer capable of free radical polymerization or a polyisocyanate.

In the present document, substance names beginning with "poly", such as, for example, polyisocyanate, polyurethane, polyester or polyol, designate substances which formally contain, per molecule, two or more of the functional groups occurring in their name.

In the present document, the term "polymer" encompasses firstly a group of chemically uniform macromolecules which however differ with respect to the degree of polymerization, molar mass and chain length, which group was prepared by a polyreaction (polymerization, polyaddition, polycondensation). Secondly, the term also encompasses derivatives of such a group of macromolecules from polyreactions, i.e. compounds which were obtained by reactions, such as, for example, additions or substitutions, of functional groups on specified macromolecules and which may be chemically uniform or chemically nonuniform. Furthermore, the term also encompasses so-called prepolymers, i.e. reactive oligomeric preadducts whose functional groups are involved in the synthesis of macromolecules.

In the present document, the term "polymeric polyol" encompasses any desired polymer according to the above definition which has more than one hydroxyl group. Accordingly, the term "polymeric dial" encompasses any desired polymer which has exactly two hydroxyl groups.

The term "polyurethane polymer" encompasses all polymers which are prepared by the so-called diisocyanate polyaddition process. This also includes those polymers which are virtually or completely free of urethane groups. Examples of polyurethane polymers are polyether-polyurethanes, polyester-polyurethanes, polyether-polyureas, polyureas, polyester-polyureas, poly-isocyanurates and polycarbodiimides.

The term "pot life" is understood as meaning the duration of processability of reactive compositions after their application. The end of the pot life is in most cases associated with a viscosity increase of the composition such that expedient processing of the composition is no longer possible.

In the present document, "molecular weight" is understood as meaning the number average molecular weight $M_n$.

The multicomponent composition according to the invention comprises at least one aqueous plastic dispersion. The aqueous plastic dispersion is selected in particular from the group consisting of an aqueous dispersion of poly(meth)acrylates; of an aqueous dispersion of copolymers of (meth)acrylates and styrene; of an aqueous dispersion of copolymers of (meth)acrylates and vinyl esters of tertiary carboxylic acids; of an aqueous dispersion of copolymers of (meth)acrylates, vinyl esters of tertiary carboxylic acids and vinyl acetate; of an aqueous dispersion of copolymers of styrene and butadiene; of an aqueous dispersion of copolymers of vinyl acetate and (meth)acrylates; of an aqueous dispersion of copolymers of vinyl acetate and ethylene; of an aqueous dispersion of copolymers of vinyl acetate, ethylene and vinyl ester; and of an aqueous polyurethane dispersion.

Tertiary carboxylic acids are understood here as meaning highly branched, saturated carboxylic acids having relatively long side chains, as also known to the person skilled in the art by the term Versatic® acids. Suitable vinyl esters of tertiary carboxylic acids are also known to the person skilled in the art as VeoVa®.

In particular, the aqueous plastic dispersion is selected from the group consisting of an aqueous dispersion of (meth)acrylate polymers; of copolymers of (meth)acrylates and styrene; of copolymers of styrene and butadiene; and of copolymers of vinyl acetate, ethylene and vinyl esters.

In the present document, aqueous plastic dispersion is understood as meaning plastic dispersions whose solid plastic constituents are already present as a dispersion in water before the preparation of the multicomponent composition as well as solid, in particular pulverulent, plastic dispersion fractions which come into contact with the water present in the multicomponent composition only on use of said composition and are dispersible in said water. Depending on the embodiment of the multicomponent composition, the aqueous plastic dispersion is used as dispersible solid or as already dispersed solid.

Furthermore, the multicomponent composition according to the invention comprises at least one monomer capable of free radical polymerization or a polyisocyanate. In particular, the multicomponent composition according to the invention comprises a monomer capable of free radical polymerization.

The proportion of monomer capable of free radical polymerization or polyisocyanate is preferably from 5 to 50% by weight, in particular from 5 to 40% by weight, preferably from 10 to 20% by weight, of the total composition.

If the composition is a composition comprising at least one monomer capable of free radical polymerization, this is selected in particular from the group consisting of vinyl esters, (meth)acrylic acid, a salt of (meth)acrylic acid, (meth)acrylates, acrylamide and styrene.

For example, suitable monomers capable of free radical polymerization are selected from the group consisting of vinyl acetate, methyl(meth)acrylate, ethyl(meth)acrylate, n-butyl and i-butyl(meth)acrylate, hexyl(meth)acrylate, 2-ethylhexyl(meth)acrylate, isodecyl(meth)acrylate, cyclohexyl(meth)acrylate, 3-tetrahydrofuryl(meth)acrylate, isobornyl(meth)acrylate, norbornyl(meth)acrylate, trimethylcyclohexyl(meth)acrylate, benzyl(meth)acrylate, hydroxyalkyl(meth)acrylate, such as 2-hydroxyethyl(meth)acrylate, 2- and 3-hydroxypropyl(meth)acrylate or hydroxybutyl (meth)acrylate, tetra-hydrefurfuryl(meth)acrylate, 2-(2-ethoxyethoxy)ethyl(meth)acrylate, butyldiglykol(meth)acrylate, isotridecyl(meth)acrylate, lauryl(meth)acrylate, stearyl(meth)acrylate, phenoxyethyl(meth)acrylate, dicyclopentadienyloxy-ethyl(meth)acrylate, dihydrodicyclopentadienyl(meth)acrylate, ethoxylated nonylphenol(meth)acrylate, alkoxypolyalkylene glycol(meth)acrylates, such as methoxypolyethylene glycol methacrylate, the molecular weight $M_n$ of the polyethylene glycol being from 300 to 1000 g/mol, preferably 350 g/mol, 500 g/mol, 750 g/mol or 1000 g/mol, aminoalkyl(meth)acrylates, such as 2-dimethylaminoethyl(meth)acrylate, or 3-dimethylaminopropyl-methacrylamide, 2-trimethylammoniumethyl(meth)acrylate chloride, 3-trimethylammoniumpropyl(meth)acrylamide chloride, N-(2-methacryloyloxy-ethyl)ethyleneurea and the like.

Crosslinking monomers, such as, for example, allyl(meth)acrylate, or crosslinking difunctional (meth)acrylates, such as, for example, oligomeric or polymeric compounds of the formula (I), are furthermore suitable as monomers capable of free radical polymerization.

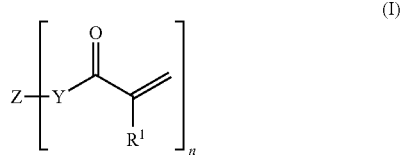

(I)

Here, the radical $R^1$ is a hydrogen atom or a methyl group. The index n has a value of 2 to 5. Furthermore, Z is a polyol after removal of n hydroxyl groups and Y is O or NR', R' being a hydrocarbon radical or a hydrogen atom, preferably a hydrogen atom.

The compound of the formula (I) is in particular selected from the group consisting of ethylene glycol di(meth)acrylate, 1,3- and 1,4-butanediol di(meth)acrylate, 1,6-hexanediol di(meth)acrylate, ethoxylated and propoxylated neopentylglycol di(meth)acrylate, propoxylated glyceryl tri(meth)acrylate, trimethylolpropane tri(meth)acrylate, trimethylolpropane di(meth)acrylate, ethoxylated trimethylolpropane tri(meth)acrylate, modified pentaerythrityl tri(meth)acrylate, propoxylated ethoxylated pentaerythrityl tetra(meth)acrylate, ditrimethylolpropane tetra(meth)acrylate and dipentaerythrityl penta(meth)acrylate.

In particular, n in the compound of the formula (I) has a value of 2 and Z is a polymeric polyol after removal of two OH groups. This polymeric polyol is in particular a polyalkylenepolyol, a polyoxyalkylenepolyol or a polyurethane polyol; a polyhydroxy-functional ethylene-propylene-diene, ethylene-butylene-diene or ethylene-propylene-diene copolymer; a polyhydroxy-functional copolymer of dienes, such as 1,3-butadiene or diene mixtures, and vinyl monomers such as styrene, acrylonitrile or isobutylene; a polyhydroxy-functional polybutadienepolyol; a polyhydroxy-functional acrylonitrile/butadiene copolymer; or a polysiloxanepolyol.

For example, such difunctional (meth)acrylates are selected from the group consisting of polyethylene glycol di(meth)acrylate, such as diethylene glycol di(meth)acrylate, Methylene glycol di(meth)acrylate, tetraethylene glycol di(meth)acrylate; polypropylene glycol di(meth)acrylate, such as dipropylene glycol di(meth)acrylate, tripropylene glycol di(meth)acrylate; and tris(2-hydroxyethyl) isocyanurate tri(meth)acrylate.

Z is furthermore suitably a diphenol, in particular an alkoxylated diphenol, after removal of two OH groups, preferably ethoxylated bisphenol A. For example, such a difunctional (meth)acrylate is commercially available under the trade name Sartomer® SR 348 from Sartomer Company, Inc., USA.

Furthermore, difunctional (meth)acrylates, such as epoxy (meth)acrylates, in particular epoxy (meth)acrylates which are obtainable from the reaction of bisphenol A diglycidyl ether with (meth)acrylic acid, are also suitable as monomers capable of free radical polymerization. For example, such a difunctional (meth)acrylate is commercially available under the trade name Sartomer® CN 104 from Sartomer Company, Inc., USA.

Suitable polyhydroxy-terminated acrylonitrile/butadiene copolymers are typically prepared from carboxyl-terminated acrylonitrile/butadiene copolymers, which are commercially available, for example, under the name Hypro® (formerly Hycar®) CTBN from Emerald Performance Materials, LLC, USA, and epoxides or amino alcohols.

Such suitable monomers of the formula (I) which are capable of free radical polymerization are, for example, also commercially available from Kraton Polymers, USA, or under the trade names Hypro® VTB and Hypro® VTBNX from Emerald Performance Materials, LLC, USA.

Furthermore, the monomer of the formula (I) is suitably a polyurethane (meth)acrylate. Such compounds can typically be prepared, in a manner known to the person skilled in the art, from the reaction of at least one polyisocyanate, in particular of a diisocyanate, and a (meth)acrylic acid, a (meth)acrylamide or a (meth)acrylate which has a hydroxyl group. Preferably, before the reaction with (meth)acrylic acid, a (meth)acrylamide or a (meth)acrylate which has a hydroxyl group, the diisocyanate can be reacted with at least one polyol P, in particular a diol, in a process known to the person skilled in the art, to give a polyurethane polymer having isocyanate groups.

In particular, hydroxyalkyl(meth)acrylates, such as hydroxypropyl acrylate (HPA), hydroxypropyl methacrylate (HPMA), hydroxybutyl acrylate (HBA) or hydroxybutyl methacrylate (HBMA), preferably hydroxyethyl acrylate (HEA) or hydroxyethyl methacrylate (HEMA), or a monohydroxy poly(meth)acrylate of a polyol, preferably of glycerol or trimethylolpropane, are suitable for reaction with the isocyanate groups of the polyisocyanate.

Polyurethane(meth)acrylates can also be prepared by esterification of a polyurethane polymer having hydroxyl groups with (meth)acrylic acid.

Furthermore, polyurethane(meth)acrylates can be prepared by reacting a (meth)acrylate which has at least one isocyanate group with a polyurethane polymer having hydroxyl groups or with a polyol as described, for example, in the present document. For example, 2-isocyanatoethyl methacrylate is suitable as a (meth)acrylate which has at least one isocyanate group.

Suitable diisocyanates are in principle all diisocyanates. For example, 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12- dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-toluene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TOBI); oligomers and polymers of the abovementioned isocyanates, and any desired mixtures of the abovementioned isocyanates are mentioned.

Preferred polyols P are polyoxyalkylenepolyols, also referred to as "polyetherpolyols", polyesterpolyols, polycarbonatepolyols and mixtures thereof. The most preferred polyols are diols, in particular polyoxyethylenediols, polyoxypropylenediols or polyoxybutylenediols.

Particularly suitable polyetherpolyols, also referred to as polyoxyalkylenepolyols or oligoetherols, are those which are polymerization products of ethylene oxide, 1,2-propylene oxide, 1,2- or 2,3-butylene oxide, oxetane, tetrahydrofuran or mixtures thereof, optionally polymerized with the aid of an initiator having two or more active hydrogen atoms per molecule, such as, for example, water, ammonia or compounds having a plurality of OH or NH groups, such as, for example, 1,2-ethanedial, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of said compounds. Both polyoxyalkylenepolyols which have a low degree of unsaturation (measured according to ASTM D-2849-69 and stated in milliequivalent unsaturation per gram of polyol (meq/g)), prepared, for example, with the aid of so-called double metal cyanide complex catalysts (DMC catalysts), and polyoxyalkylenepolyols having a higher degree of unsaturation, prepared, for example, with the aid of anionic catalysts, such as NaOH, KOH, CsOH or alkali metal alcoholates, may be used.

Polyoxyethylenepolyols and polyoxypropylenepolyols, in particular polyoxyethylenediols, polyoxypropylenediols, polyoxyethylenetriols and polyoxypropylenetriols, are particularly suitable.

Polyoxyalkylenediols or polyoxyalkylenetriols having a degree of unsaturation of less than 0.02 meq/g and having a molecular weight in the range from 1000 to 30 000 g/mol and polyoxyethylenediols, polyoxyethylenetriols, polyoxypropylenediols and polyoxypropylenetriols having a molecular weight of from 400 to 8000 g/mol are particularly suitable.

Also particularly suitable are so-called ethylene oxide-terminated ("EO-endcapped", ethylene oxide-endcapped) polyoxypropylenepolyols. The latter are special polyoxypropylenepolyoxyethylenepolyols which are obtained, for example, by further alkoxylating pure polyoxypropylenepolyols, in particular polyoxypropylenediols and -triols with ethylene oxide after the end of the polypropoxylation reaction and have primary hydroxyl groups as a result. In this case, polyoxypropylenepolyoxyethylenediols and polyoxypropylenepolyoxy-ethylenetriols are preferred.

Styrene-acrylonitrile-grafted polyetherpolyols, as are commercially available, for example, under the tradename Lupranol® from Elastogran GmbH, Germany, are furthermore suitable.

In particular, polyesters which carry at least two hydroxyl groups and are prepared by known processes, in particular the polycondensation of hydroxycarboxylic acids or the polycondensation of aliphatic and/or aromatic polycarboxylic acids with dihydric or polyhydric alcohols, are suitable as polyesterpolyols.

Polyesterpolyols which are prepared from dihydric to trihydric alcohols, such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the abovementioned alcohols, with organic dicarboxylic acids or anhydrides or esters thereof, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, and polyesterpolyols obtained from lactones, such as, for example, ε-caprolactone, are particularly suitable.

Polyesterdiols, in particular those which are prepared from adipic acid, azelaic acid, sebacic acid, dodecanedicarboxylic acid, dimer fatty acid, phthalic acid, isophthalic acid and terephthalic acid as the dicarboxylic acid or from lactones, such as, for example, ε-caprolactone, and from ethylene glycol, diethylene glycol, neopentylglycol, 1,4-butanediol, 1,6-hexanediol, dimer fatty acid diol and 1,4-cyclohexanedimethanol as the dihydric alcohol, are particularly suitable.

Particularly suitable polycarbonate polyols are those as are obtainable by reacting, for example, the abovementioned alcohols used for the synthesis of the polyesterpolyols with dialkyl carbonates, such as dimethyl carbonate, diaryl carbonates, such as diphenyl carbonate, or phosgene. Polycarbonatediols, in particular amorphous polycarbonatediols, are particularly suitable.

Further suitable polyols are poly(meth)acrylate polyols.

Polyhydroxy-functional fats and oils, for example natural fats and oils, in particular castor oil, or polyols obtained by chemical modification of natural fats and oils, so-called oleochemical polyols, the epoxypolyesters or epoxypolyethers obtained, for example, by epoxidation of unsaturated oils and subsequent ring opening with carboxylic acids or alcohols, or polyols obtained by hydroformylation and hydrogenation of unsaturated oils are furthermore suitable. These are furthermore polyols which are obtained from natural fats and oils by degradation processes, such as alcoholysis or ozonolysis, and subsequent chemical linkage, for example by transesterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

Furthermore, polyhydrocarbon-polyols, also referred to as oligohydro-carbonols, for example polyhydroxy-functional ethylene-propylene, ethylene-butylene or ethylene-propylene-diene copolymers, as produced, for example, by Kraton Polymers, USA, or polyhydroxy-functional copolymers obtained from dienes, such as 1,3-butadiene or diene mixtures, and vinyl monomers, such as styrene, acrylonitrile or isobutylene, or polyhydroxy-functional polybutadiene polyols, for example those which can be prepared by copolymerization of 1,3-butadiene and allyl alcohol or by oxidation of polybutadiene and can also be hydrogenated, are likewise suitable.

Polyhydroxy-functional acrylonitrile/butadiene copolymers, as can be prepared, for example, from epoxides or amino alcohols and carboxyl-terminated acrylonitrile/butadiene copolymers (commercially available under the name Hypro® CTBN from Emerald Performance Materials, LLC, USA), are furthermore suitable.

Said polyols preferably have an average molecular weight of from 250 to 30 000 g/mol, in particular from 1000 to 30 000 g/mol, and an average OH functionality in the range from 1.6 to 3.

Particularly suitable polyols are polyesterpolyols and polyetherpolyols, in particular polyoxyethylenepolyol, polyoxypropylenepolyol and polyoxy-propylenepolyoxyethylenepolyol, preferably polyoxyethylenediol, polyoxypropylenediol, polyoxyethylenetriol, polyoxypropylenetriol, polyoxypropylene-polyoxyethylenediol and polyoxypropylenepolyoxyethylenetriol.

In addition to said polyols, small amounts of low molecular weight di- or polyhydric alcohols, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures of the abovementioned alcohols can be concomitantly used in the preparation of the polyurethane polymer having isocyanate groups.

For example, suitable polyols P are described in the paragraphs [0029] to [0039] of US 2006/0122352 A1, the entire disclosure of which is hereby incorporated by reference.

In particular, the monomer of the formula (I) which is capable of free radical polymerization is liquid at room temperature, which also includes viscous and highly viscous compounds. Most preferably, however, the monomer of the formula (I) which is capable of free radical polymerization is liquid or of low viscosity at room temperature.

In particular, the monomer capable of free radical polymerization is a hydrophilic(meth)acrylate monomer. Preferred hydrophilic(meth)acrylate monomers are selected from the group consisting of (meth)acrylic acid, a salt of (meth)acrylic acid, a hydroxyalkyl(meth)acrylate, such as hydroxyethyl acrylate (HEA), hydroxyethyl methacrylate (HEMA), hydroxypropyl acrylate (HPA), hydroxypropyl methacrylate (HPMA), hydroxybutyl acrylate (HBA), hydroxybutyl methacrylate (HBMA), a monohydroxy poly(meth)acrylate of a polyol, such as glycerol or trimethylolpropane, and an alkoxypolyalkylene glycol (meth)acrylate, such as methoxypolyethylene glycol methacrylate, the molecular weight $M_n$ of the polyethylene glycol being from 300 to 1000 g/mol, preferably 350 g/mol, 500 g/mol, 750 g/mol or 1000 g/mol.

If the monomer capable of free radical polymerization is a monomer of the formula (I), this too preferably has a composition such that a hydrophilic monomer results. Thus, starting materials which are as hydrophilic as possible or optionally starting materials with fractions which are as little hydrophobic as possible are to be used in the synthesis of such monomers.

Among the monomers of the formula (I), polyethylene glycol di(meth)acrylates or hydrophilic polyurethane(meth)acrylates are particularly suitable.

Most preferred hydrophilic(meth)acrylate monomers are HPA, HPMA, HBA, HBMA, HEA or HEMA.

Of course, it is possible and may even be advantageous to use mixtures of the above-described monomers capable of free radical polymerization. Also possible is the use of poly(meth)acrylates of the above-described monomers capable of free radical polymerization, these poly(meth)-acrylates having in particular a molecular weight $M_n$ of ≤5000 g/mol.

If the multicomponent composition according to the invention is a composition which has a monomer capable of free radical polymerization, the composition may furthermore comprise at least one metal (meth)acrylate. Metal (meth)acrylates have the property of increasing the strength, the adhesion and the thermal stability of hardened compositions based on monomers capable of free radical polymerization, without adversely affecting the flexibility and the elongation at break thereby.

Suitable metal (meth)acrylates are metal (meth)acrylates of calcium, magnesium or zinc. Preferred metal (meth)acrylates are zinc di(meth)acrylate, calcium di(meth)acrylate, Zn(OH) (meth)acrylate and magnesium di(meth)acrylate, most preferably magnesium di(meth)acrylate.

The proportion of metal (meth)acrylate, based on the total composition, is preferably from 0.1 to 20% by weight, in particular from 1 to 15% by weight, preferably from 1 to 10% by weight.

Furthermore, the multicomponent composition according to the invention which has a monomer capable of free radical polymerization preferably comprises at least one free radical initiator.

The free radical initiator is in particular selected from the group consisting of azobisisobutyronitrile (AIBN), an inorganic peroxide compound, in particular a peroxide compound from potassium and/or ammonium peroxodisulfate, preferably sodium persulfate, and an organic peroxide compound, in particular dibenzoyl peroxide.

The free radical initiator is usually used in an amount of from 0.01 to 5% by weight, in particular from 0.01 to 1% by weight, preferably from 0.05 to 0.1% by weight, based on the total composition.

In addition to the free radical initiator, such a composition typically furthermore has at least one catalyst for the free radical formation, which is often also referred to as accelerator. This catalyst is in particular a tertiary amine, a transition metal salt or a transition metal complex. For example, such suitable tertiary amines are in particular selected from the group consisting of di- or trialkanolamines, preferably di- or triethanolamine or a mixture thereof, N,N-dimethylaniline, N,N-diethylaniline, N,N-bis(hydroxyalkyl)anilines, such as N,N-bis(2-hydroxyethyl)aniline, N,N-alkylhydroxyalkylanilines, such as N-ethyl-N-hydroxyethylaniline, N,N-dimethyl-p-toluidine, N,N-diethyl-p-toluidine, N-methyl-N-hydroxyethyl-p-toluidine, N,N-bis(2-hydroxyethyl)-p-toluidine, and alkoxylated N,N-bis(hydroxyethyl)-p-toluidines, N-ethoxylated p-toluidine, N,N-bis(2-hydroxyethyl)xylidine, N-alkylmorpholine and mixtures thereof. Transition metal salts and transition metal complexes are, for example, salts and complexes of cobalt, nickel, copper, manganese or vanadium.

Further preferred catalysts for the free radical formation are described, for example, in the paragraphs [0041]-[0054]

of US 2002/0007027 A1, the entire disclosure of which is hereby incorporated by reference.

The catalyst for the free radical formation is in particular a di- or trialkanolamine, preferably di- or triethanolamine or a mixture thereof.

The catalyst for the free radical formation is usually used in an amount of from 0.01 to 3% by weight, in particular from 0.1 to 2% by weight, based on the total composition.

Other free radical initiators which may be used are, for example, molecules which, under the influence of heat or of electromagnetic radiation, form free radicals which then lead to the polymerization of the composition. These are typically thermally activatable free radical initiators and photoinitiators.

Suitable thermally activatable free radical initiators are those which are still sufficiently stable at room temperature but form free radicals at slightly elevated temperature.

Free radical initiators which form free radicals under the influence of electromagnetic radiation are referred to as photoinitiator. A photoinitiator which forms free radicals on irradiation with an electromagnetic radiation having a wavelength of from 230 nm to 400 nm and is liquid at room temperature is particularly suitable. For example, such photoinitiators are selected from the group consisting of α-phydroxyketones, phenyl glyoxylates, monoacylphosphines, diacyiphosphines, phosphine oxides and mixtures thereof.

If the composition is a composition comprising at least one polyisocyanate, this is in particular a polyurethane polymer having isocyanate groups, as is preferably obtainable from a diisocyanate and a polyol. Suitable diisocyanates and suitable polyols have already been described above.

In particular, these polyurethane polymers having isocyanate groups are hydrophilic polyurethane polymer having isocyanate groups and based on TDI, MDI or HMDI.

In particular, the polyurethane polymer having isocyanate groups is moisture-reactive.

If the multicomponent composition according to the invention is a composition which has a polyisocyanate, the composition furthermore comprises in particular a polyol P whose hydroxyl groups can react with the isocyanate groups of the polyisocyanate. Polyols which are optionally used in addition to the polyisocyanate are polyols as have already been described above. The polyol P is preferably a diol or a triol.

Furthermore, the multicomponent composition according to the invention comprises at least one cementitious binder. In particular, single cements, composite cements, Portland cements or mixtures of Portland cement with slag sand are suitable as a cementitious binder. The cementitious binder is preferably a fine cement or an ultrafine cement, in particular a cement having a fineness of from 2000 to 16 000 cm$^2$/g according to Blaine.

The cementitious binder which is used in the multicomponent composition according to the invention may furthermore contain admixtures known to the person skilled in the art, as often used in cements. For example, such admixtures are superplasticizers, which influence the consistency of the cementitious binder to provide improved processability.

Suitable superplasticizers are commercially available from Sika Schweiz AG, for example under the trade name Sika Viscocrete®.

The proportion of the cementitious binder, based on the total multicomponent composition, is preferably from 10 to 70% by weight, in particular from 20 to 60% by weight, preferably from 25 to 50% by weight.

The composition according to the invention may additionally contain further constituents. Such additional constituents are in particular dyes, pigments, inhibitors, UV and heat stabilizers, antistatic agents, flameproofing agents, biocides, plasticizers, stabilizers, waxes, leveling agents, emulsifiers, adhesion promoters, thixotropic agents, viscosity improvers and further customary raw materials and additives known to the person skilled in the art.

The composition according to the invention is a multicomponent composition, the individual components differing according to the embodiment of the composition. Typically, the composition according to the invention is a two-pack composition, two components K1 and K2 being stored separately from one another until their application.

A first embodiment comprises a multicomponent composition which has a monomer capable of free radical polymerization. Typically, the first component K1 comprises in particular those ingredients of the described composition which have groups capable of free radical polymerization. The second component K2 comprises in particular the free radical initiators. Furthermore, in a two-pack composition, other constituents, in particular those which would adversely affect the storage stability of the composition by reacting with one another, can also be stored separately.

In a particularly preferred variant of this first embodiment, the multicomponent composition is present in a manner such that firstly the liquid and the solid constituents and, independently thereof, the free radical initiator and the catalyst for the free radical formation are present in each case separately from one another. The liquid constituents are in particular the water and the monomers capable of free radical polymerization and optionally further constituents capable of free radical polymerization. The solid constituents are especially the cementitious binder. The plastic dispersion may be present either in dispersed form together with the liquid constituents or in solid form with the solid constituents. In a first step, the liquid and solid constituents are mixed with one another, a polymerization reaction of the monomers capable of free radical polymerization not occurring as yet because the free radical initiator and the catalyst for the free radical formation have not yet been admixed. This mixture is then typically divided into two halves, the free radical initiator being added to one half of the mixture and the catalyst for the free radical formation being added to the other half. Thus, the two components K1 and K2 are obtained and are then mixed with one another before or during the application of the composition.

A second embodiment comprises a multicomponent composition which has a polyisocyanate as the polymerizable monomer. Typically in this case, the first component K1 comprises in particular those ingredients of the described composition which have isocyanate groups. The second component K2 comprises in particular constituents which are reactive with isocyanate groups or have groups reactive with isocyanate groups.

Preferably, the first component K1 in this second embodiment comprises the polyisocyanate and optionally solid plastic dispersion fractions. The second component K2 comprises all other constituents of the multicomponent composition, in particular the water and also the optionally present polyol P.

Since the component K2 in this second embodiment described comprises both liquid and solid constituents, it is typically prepared only before the application by mixing the solid and the liquid constituents. An advantage of this is certainly the simpler handling during the storage and during the transport of the component K2.

The multicomponent composition according to the invention is suitable for a multiplicity of applications, in particular for filling and/or injecting cracks, flaws and cavities in structures or earth and rock formations.

In addition to the filling with injecting tubes, this material can be used under very different boundary conditions for crack injection. Even in the case of flowing water in the filled body, this material can be used owing to the possibility of a very rapid reaction of the organic components. Furthermore, filling injections or curtain injections into the earth can also be realized in an extremely economical manner with the compositions according to the invention because the properties of the expensive organic constituents are combined with the properties of the more economical cementitious binder.

The invention therefore furthermore relates to the use of a multicomponent composition as was described above for filling and/or injecting cracks, flaws and cavities in structures or earth and rock formations.

In particular, the composition according to the invention is used as injection material and is therefore applied via filling and/or injecting tubes.

For the application of the multicomponent composition, the latter is preferably injected with the aid of a one- or two-component pump via filling and injecting tubes (injection packers) into a component or an earth or rock formation under pressure or applied with the aid of an airless gun onto surfaces for sealing surface flaws and leaks.

For this purpose, the liquid and the solid constituents of which the multicomponent composition consists in its initial state are preferably mixed with one another only on site, for example on the building site, immediately before use of the composition, with the aid of a high-speed mixer. The reactive organic constituents are typically not yet mixed with one another in this phase.

During the mixing of the total multicomponent composition, i.e. including the reactive constituents with one another, different procedures may be adopted depending on the embodiment. If the reaction time or the duration of curing of the organic constituents is adjusted, for example, so that the curing does not take place within a short time, i.e. the so-called pot life permits reasonable processing of the composition after the mixing of the reactive components, all constituents of the multicomponent composition can be mixed with one another immediately before the application and then injected, for example by means of a one-component pump, into an injecting tube or applied to a substrate. If on the other hand the multicomponent composition is such that the reaction of the organic constituents is to take place within a short time after the mixing, the composition is applied with the aid of a two-component pump, the two reactive components being mixed with one another only on application.

The hardening of the multicomponent composition according to the invention takes place firstly by the hydration of the cement present and secondly by the polymerization of the polymerizable constituents.

If the multicomponent composition is a composition which has monomers capable of free radical polymerization, the curing takes place by free radical polymerization of the monomers capable of free radical polymerization and optionally further constituents capable of free radical polymerization and present in the composition.

If the multicomponent composition is a composition which has polyisocyanates, in particular in combination with polyols P, the curing takes place by the reaction of the isocyanate groups of the polyisocyanate with the hydroxyl groups of the polyol with formation of a polyurethane polymer.

Both with the use of monomers capable of free radical polymerization and with the use of polyisocyanates, the course, in particular the rate, of the reactions leading to the hardening of the composition can be adjusted by the choice of the constituents used.

Thus, in the case of sealing or filling with flowing water in the filled body, the conditions or the constituents of the multicomponent composition can be chosen so that the hardening of the composition takes place as quickly as possible and the composition acquires a high initial strength at an early stage. In contrast, slowly hardening compositions can be used, for example, if the composition is to be introduced via an injecting tube into dry cracks and flaws and the same injecting tube is to be flushed through and cleaned thereby to enable it to be used again for later injections. Compositions which harden too quickly would in this case block the injecting tube.

The present invention furthermore relates to a method for applying the multicomponent composition as was described above, the multicomponent composition being injected with a one- or two-component pump via filling and injecting connections into a component, into an earth or rock formation or into a construction joint or linear flaw.

The invention furthermore relates to a method for applying the multicomponent composition as was described above, the multicomponent composition being applied with an airless gun to surfaces for sealing surface flaws and leaks.

The present invention furthermore relates to a hardened composition as is obtainable from a multicomponent composition described above.

EXAMPLES

Working examples which are intended to illustrate in more detail the invention described are listed below. Of course, the invention is not limited to these described working examples.

Table 1 shows an exemplary formulation with quantity data for the constituents, defined by brand names, as are usual at the time of the application.

TABLE 1

| Brand/component | Description | Parts by weight |
|---|---|---|
| Multigel ® 850 [a] | Standard acrylate-based injection resin consisting of different hydrophilic acrylate monomers | 12.1 parts by weight |
| VINNAPAS ® 7031H [b] | Dispersion powder | 18 parts by weight |
| Catalyst | Aqueous solution of triethanolamine | 0.3 part by weight |
| Free radical initiator | Aqueous sodium persulfate solution (4.4% by weight) | 1.5 parts by weight |
| Water | | 36.3 parts by weight |
| Mikrodur ®-RU [c] | Ultrafine cement | 30.3 parts by weight |
| MSH [d] | Superplasticizer | 1.5 parts by weight |

Multicomponent composition in parts by weight;
[a] available from Tricosal Bauabdichtungs-GmbH, Germany;
[b] available from Wacker Chemie AG, Germany;
[c] available from Dyckerhoff AG, Germany;
[d] sodium salt of the naphthalene sulfonate.

By combining cement with an acrylate material and a plastic dispersion according to table 1, an injection material that has the following property spectrum results:

Reaction Times

The reaction time can be adjusted between a few seconds and several hours with the aid of the catalyst for the free radical formation. The maximum open time is also decisively influenced by the cement quality used and the alkalinity thereof.

The formulation according to table 1 has a pot life of about 70 minutes at 20° C. and is therefore suitable both for the injection of cracks and for the filling of injecting tubes under pressure.

For further formulations, the influence of the catalyst for the free radical formation is shown in tables 2 and 3 below:

TABLE 2

| Brand/component | Description | Parts by weight |
|---|---|---|
| Hydroxyethyl methacrylate | Monomer | 30 parts by weight |
| Acronal ® DS 3511 [e] | Plastic dispersion | 8 parts by weight |
| Triethanolamine solution (50% by weight in water) | Catalyst | varies for showing the influence |
| Sodium persulfate solution (4.4% by weight in water) | Free radical initiator | 4 parts by weight |
| | Water | 18 parts by weight |
| Tricodur ® [f] | Ultrafine cement | 40 parts by weight |

Multicomponent composition in parts by weight;
[e] available from BTC Speciality Chemical Distribution SAS;
[f] available from Tricosal Bauabdichtungs-GmbH, Germany.

TABLE 3

| Results of the variation of the amount of catalyst. | |
|---|---|
| Parts by weight of the catalyst | Reaction time in min |
| 1 part by weight | 72 minutes |
| 2 parts by weight | 40 minutes |
| 3 parts by weight | 23 minutes |

Material Properties

In the case of a high proportion of poly(meth)acrylate, the end product may be soft and flexible. With decreasing proportion of poly(meth)acrylate, the reaction product solidifies with increasing time and the material properties of the cementitious binder dominate after a few days. By using a suitable additional plastic component in the form of a solid plastic dispersion fraction or in the form of a liquid plastic dispersion, permanent resilience of the injection material can be achieved.

Samples of the completely hardened composition according to the formulation in table 1 still have resilient and flexible behavior even after 15 months.

The hardness of the hardened composition depends on its constituents. The influence of the polymerizable monomers on the hardness of the injection material is shown in tables 4, 5 and 6 below.

TABLE 4

| Multicomponent composition with different monomer composition. | | | |
|---|---|---|---|
| Brand/component | Description | Parts by weight | |
| Hydroxyethyl methacrylate | Monomer 1 | varies for showing the influence | 30 parts by weight |
| Methoxypolyethylene glycol methacrylate | Monomer 2 | varies for showing the influence | |
| Polyethylene glycol dimethacrylate, $M_n$ (polyethylene glycol) = 600 g/mol | Monomer 3 | varies for showing the influence | |
| Acronal ® DS 3511 | Plastic dispersion | 8 parts by weight | |
| Triethanolamine solution (50% by weight in water) | Catalyst | 1 part by weight | |
| Sodium persulfate solution (4.4% by weight in water) | Free radical initiator | 4 parts by weight | |
| Water | | 17 parts by weight | |
| Tricodur ® | Ultrafine cement | 40 parts by weight | |

TABLE 5

| | Monomer composition | | |
|---|---|---|---|
| Experiment | % by weight of monomer 1 | % by weight of monomer 2 | % by weight of monomer 3 |
| Experiment 1 | 100% | | |
| Experiment 2 | 85% | 15% | |
| Experiment 3 | 70% | 30% | |
| Experiment 4 | 98% | | 2% |
| Experiment 5 | 68% | 30% | 2% |

TABLE 6

Shore A of multicomponent compositions with different monomer composition, determined according to DIN 53505.

| Experiment | Hardness in Shore A |
|---|---|
| Experiment 1 | 90 |
| Experiment 2 | 62 |
| Experiment 3 | 55 |
| Experiment 4 | 77 |
| Experiment 5 | 28 |

Swelling

With a high proportion of poly(meth)acrylates, a substantial swelling effect is measurable. The swelling provides additional safety of the seal and moreover compensates for possible shrinkage effects which may occur in the case of very fine cements.

For determining the swelling of compositions according to the invention, the formulation of experiment 5 from tables 4 and 5 is used, the cementitious binder being varied to show the influence.

The swelling is determined on the basis of DIN 53495. The swelling takes place in 400 ml (±10%) of demineralized water having a pH of 4.9 and at room temperature (23° C.). The storage vessel used is an 860 ml polyethylene beaker, which remains closed during the entire storage. The water is not changed. The swelling of the samples is determined by measuring the water absorption, the sample being dabbed with a filter paper after removal from the water bath. A first measurement is effected after storage for 54 days ("54 d"), and a second measurement after storage for 180 days ("180 d"). The swelling is stated in percent as the weight increase in the sample during storage in water compared with the sample before storage in water. The results are shown in table 7.

TABLE 7

| | pH [g] | Swelling (54 d) [% by weight] | Swelling (180 d) [% by weight] |
|---|---|---|---|
| Formulation with Mikrodur ®-RU | 11.94 | 51.6 | 54.8 |
| Formulation with Mikrodur ®-PU [h] | 12.58 | 23.2 | 21.5 |
| Formulation with Tricodur ® | 12.05 | 43.9 | 44.6 |
| Formulation with Rheocem ® 650 | 12.62 | 19.1 | 17.9 |

Swelling experiments;
[g] pH of the demineralized water with sample;
[h] available from Dyckerhoff AG, Germany.

pH

All reaction products, in particular products based on Portland cement, have high alkalinity and therefore promote the passivation of the reinforcing steel. In contrast to many classical acrylate resins, the high pH ensures active corrosion protection.

Samples of set injection material according to the formulation of table 1 have a pH of 11.6.

The pH of the demineralized water from the swelling experiments with the sample present therein are shown in table 7.

The invention claimed is:

1. A multicomponent composition for filling and/or injecting cracks, flaws and cavities in structures or earth and rock formations, comprising
   water;
   at least one cementitious binder;
   an aqueous plastic dispersion; and
   at least one monomer capable of free radical polymerization
   wherein:
   the monomer capable of free radical polymerization is a hydrophilic (meth)acrylate monomer,
   the composition additionally contains at least one free radical initiator, and
   the at least one free radical initiator is an inorganic peroxide.

2. The multicomponent composition as claimed in claim 1, wherein the aqueous plastic dispersion is selected from the group consisting of an aqueous dispersion of (meth)acrylate polymers; of copolymers of (meth)acrylates and styrene; of copolymers of styrene and butadiene; and of copolymers of vinyl acetate, ethylene and vinyl ester.

3. The multicomponent composition as claimed in claim 1, wherein the composition additionally has at least one catalyst for the free radical formation.

4. The multicomponent composition as claimed in claim 3, wherein the catalyst for the free radical formation is a di- or a trialkanolamine, or a mixture thereof.

5. The multicomponent composition as claimed in claim 1, wherein the cementitious binder is a fine cement and/or an ultrafine cement.

6. The multicomponent composition as claimed in claim 5, wherein the cementitious binder is a single cement, a composite cement, a Portland cement or a mixture of Portland cement and slag sand.

7. A method for filling and/or injecting cracks, flaws and cavities in structures or earth and rock formations, the method comprising:
   applying the multicomponent composition as claimed in claim 1.

8. The method as claimed in claim 7, wherein the multicomponent composition is applied via filling and/or injecting tubes.

9. A method for applying the multicomponent composition as claimed in claim 1, wherein the multicomponent composition is injected with a one- or two-component pump via filling and injecting connections into a component, into an earth or rock formation or into a construction joint or linear flaw.

10. A method for applying the multicomponent composition as claimed in claim 1, wherein the multicomponent composition is applied with an airless gun to surfaces for sealing surface flaws and leaks.

\* \* \* \* \*